United States Patent [19]
Bray

[11] 3,794,172
[45] Feb. 26, 1974

[54] STORAGE AND DISPENSING APPARATUS FOR A REVERSE OSMOSIS WATER PURIFICATION SYSTEM

[75] Inventor: Donald T. Bray, Escondido, Calif.

[73] Assignee: Desalination Systems, Inc., Escondido, Calif.

[22] Filed: Aug. 29, 1972

[21] Appl. No.: 284,489

[52] U.S. Cl.................. 210/257, 210/321, 210/433
[51] Int. Cl............................................ B01d 31/00
[58] Field of Search ...... 210/23, 321, 433, 257, 258

[56] References Cited
UNITED STATES PATENTS

| | | | |
|---|---|---|---|
| 3,688,911 | 9/1972 | Baerg | 210/321 |
| 3,719,593 | 3/1973 | Astil | 210/321 X |
| 3,679,055 | 7/1972 | Clark et al. | 210/321 X |
| 3,589,862 | 6/1971 | Veloz | 21/102 R |
| 3,630,378 | 12/1971 | Bauman | 210/321 X |

Primary Examiner—Frank A. Spear, Jr.
Attorney, Agent, or Firm—Clement H. Allen

[57] ABSTRACT

Storage and dispensing apparatus for a reverse osmosis water purification system includes a storage container or tank, in which purified water is stored, connected to a dispensing valve. The purified water in this storage tank is separated, as by a pressure transmitting diaphragm or a gradient barrier, from impure water used as feed for the purification unit and which is normally maintained also in the storage tank under pressure no greater than slightly above atmospheric for example, 10 psig more or less. Opening the purified water dispensing valve actuates a diaphragm valve which opens to supply impure water into the storage tank at an elevated pressure of, for example 40 to 100 psig more or less, thus pressurizing the purified water in the storage tank to a pressure substantially elevated above its normal storage pressure for delivery through the dispensing valve.

9 Claims, 2 Drawing Figures

STORAGE AND DISPENSING APPARATUS FOR A REVERSE OSMOSIS WATER PURIFICATION SYSTEM

BACKGROUND OF THE INVENTION

1. Field of the Invention

This invention relates to apparatus for temporarily storing purified water produced by a reverse osmosis purification system.

2. The Prior Art

Various types of apparatus for storing purified water produced by a reverse osmosis system have been proposed and used by the prior art, such as described in U.S. Pat. No. 3,493,496; U.S. Pat. No. 3,568,843; and U.S. Pat. No. 3,616,921. These arrangements are useful under many conditions but do not provide purified water storage under relatively low pressure with an accompanying capability for delivery of purified water on demand at relatively high or elevated pressure. It is important to preserve the highest possible pressure drop across the reverse osmosis module so that greatest membrane operating efficiency is maintained; at the same time water for delivery to a dispensing valve or point of use must be at an elevated pressure since the valve or faucet location may be remote from the purification unit and ample pressure will be required to provide desired flow to the outflow point. Thus for a household reverse osmosis system with a water storage facility, the purified water pressure in the storage container should normally not be more than slightly above atmospheric, preferably 10 psig or so, since more than this will reduce the pressure drop across the reverse osmosis module (the difference between the input household line feed pressure of the order of 40–100 psig and the purified water storage pressure) and result in seriously lowered purification efficiency and output. While the normal water storage pressure should for this reason be low, output pressure from the storage tank should be sufficiently elevated to provide adequate water flow through the delivery or transfer pipe system to the dispensing valve when this valve is opened, and this may be of the order of 40 to 100 psig more or less.

Operation of previously proposed purified water storage arrangements has generally resulted in a gradual increase in stored water pressure as purified water has been produced by the reverse osmosis unit and stored in a container. As the pressure of the stored water rises, the efficiency of the reverse osmosis unit decreases because of decreased pressure drop across the membrane as explained above. Operation of apparatus according to this invention, however, will result in efficient storage of purified water at no more than slightly above atmospheric pressure, thus preserving a high pressure drop across the reverse osmosis module for best operating efficiency; while at the same time making purified water available on demand from the storage container at an elevated pressure of the order of the original feed line pressure.

SUMMARY OF THE INVENTION

Summarized briefly, the water storage and dispensing apparatus of this invention comprises a closed, pressure resistant container into which purified water from a reverse osmosis water purification unit is delivered and temporarily stored normally under pressure slightly above atmospheric, this pressure in the storage container is maintained preferably by means for releasing a restricted flow of liquid from such container, such as a pressure relief valve or a restricted passageway. Dispensing means for the purified water in the storage container are connected thereto, these means including a dispensing valve. Also connected to the storage container is a supply of impure water, preferably the feed water supplied to the reverse osmosis system, introduction of this impure water being controlled by a pressure responsive valve which is normally maintained closed by the pressure of the purified water in the storage container through a connection with the purified water supply to the dispensing valve. Opening the dispensing valve causes a reduction of pressure in its purified water supply connection thus opening the pressure responsive valve and allowing introduction of impure water under elevated pressure into the storage container. This pressurizes the purified water in the storage container so that purified water is supplied on demand at elevated pressure to the piping supplying the dispensing valve.

The impure water in the storage container is kept apart from the purified water stored therein by a pressure transmitting separation, for example, a flexible diaphragm described in U.S. Pat. No. 3,493,496, or a gradient barrier described in U.S. Pat. No. 3,616,921.

BRIEF DESCRIPTION OF THE DRAWINGS

Construction and operation of the apparatus of this invention will be more readily understood by reference to the detailed description thereof and to the annexed drawings in which.

DESCRIPTION OF PREFERRED EMBODIMENTS

Figure 1:
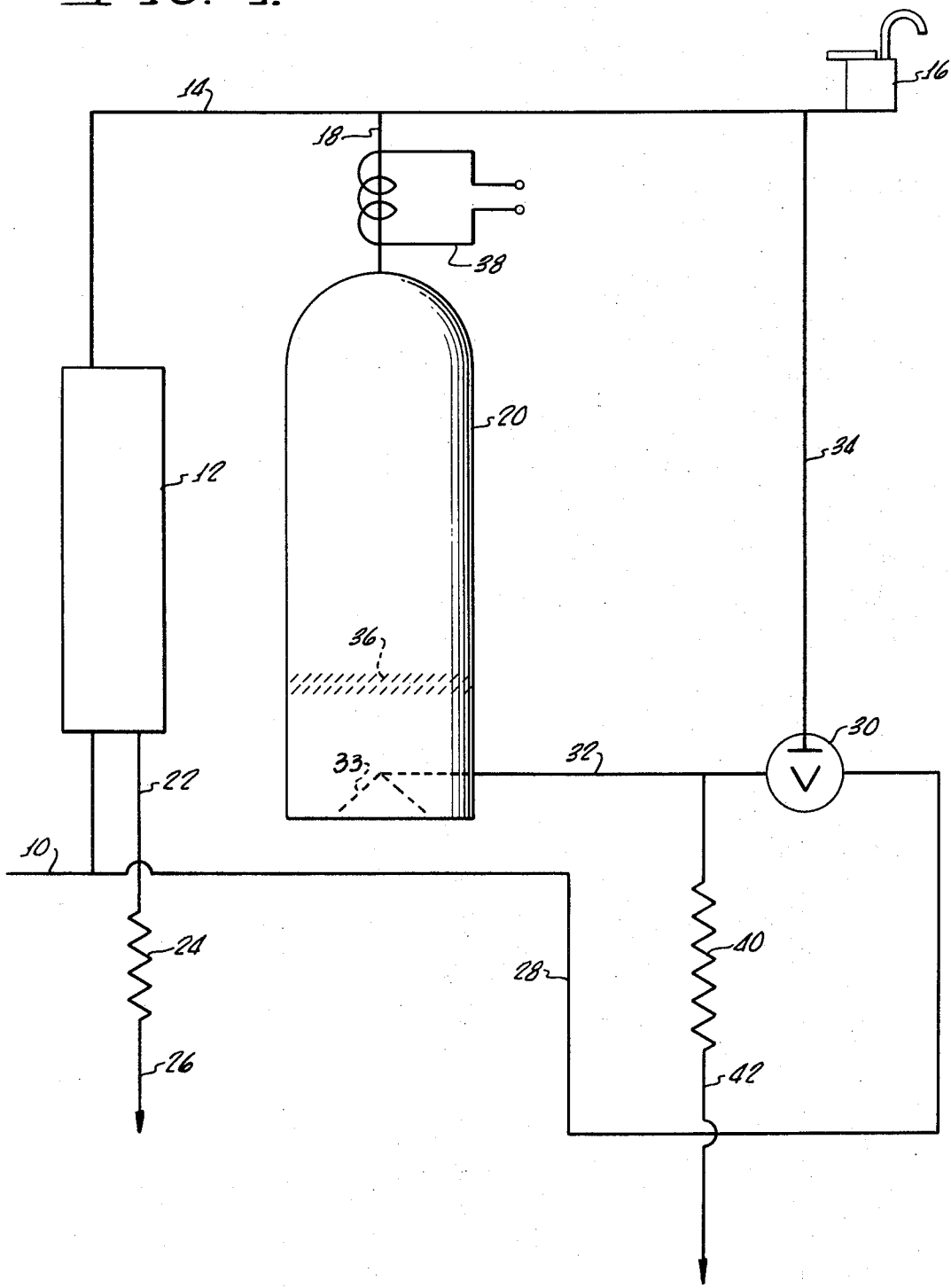
FIG. 1 is a diagrammatic illustration of apparatus embodying features of this invention.

Referring now to FIG. 1 a source of impure feed water such as a household main at a pressure of 40 to 100 psig, more or less, is connected as by pipe line 10 into a reverse osmosis unit or module 12 which contains a semipermeable membrane supported by suitable structure and capable of separating dissolved salts from solutions. Such units or modules are described in patents, including U.S. Pat. Nos. 3,367,504; 3,400,825; and 3,542,203. They are available commercially and will not therefore be herein described in detail. A purified water transfer pipe or line 14 from module 12 is connected to dispensing valve 16 and also through a connecting line 18 into the top of a pressure resistant storage container 20.

Brine or blowdown from module 12 is released through pipe line 22 which is connected to back pressure control means of conventional type such as a restricted passageway illustrated at 24 and which maintains operating pressure in module 12 of close to the main pressure in pipe line 10, while releasing a slow flow of brine out of pipe line 26 to sewer or drain.

Feed pipe line 10 is also connected by line 28 to the input side of a pressure responsive valve such as illustrated at 30, the output of this valve 30 being connected by line 32 to the bottom of storage container 20, with turbulence minimizing means such as a suitable baffle arrangement 33. Pressure responsive valve 30 is advantageously of a commercially available diaphragm type being actuated or controlled by pressure on its diaphragm, which in the embodiment illustrated in the drawing will be the pressure in line 34 connected to the purified water input of dispensing valve 16 and which, as will be evident, will be connected also to the top of storage container 20 through line 18 and purified water transfer line 14 from module 12.

Impure water in storage container 20 is separated from the purified water introduced into this container by a pressure transmitting separator such as a gradient barrier illustrated at 36. This gradient barrier is formed at the interface between the purified water introduced at the top and the impure water introduced at the bottom of storage container 20. The purified water entering the top of container 20 through line 18 will be of lower density (because of its lower salt content) than the impure water introduced through line 32 into the bottom of container 20, and will tend to float on top of the heavier impure water forming the barrier or separating layer illustrated at 36. Intermingling of the separated waters will be extremely slow through barrier layer 36 because of the inherent slow rate of diffusion between the two layers. The density difference between the purified and impure water layers can be increased by slightly heating the purified water as by electric heating coil 38 surrounding line 18 so that the purified water in the top portion of pressure resistant container 20 is maintained at a slightly higher temperature than the impure water at the bottom by continued input of warmer, lower density purified water. The temperature increase, as will be apparent, tends to further reduce the density of the purified water. For effective separation the temperature difference need not be great, often only a fraction of a degree fahrenheit, or up to several degrees, being required.

The pressure of the waters (purified and impure) in pressure container 20 is controlled by pressure control means such as a restricted passageway illustrated at 40 through which a small amount of impure water will flow from storage container 20 out pipe line 42 to sewer or drain to maintain its contents under operating conditions normally at a pressure slightly above atmospheric, for example, of the order of 10 psig. The amount of flow through restricted passageway 40 will be equal to the production of purified water from module 12 during periods when dispensing valve 16 is closed and the pressure drop across restructed passageway 40 will build up to whatever pressure is needed to accomplish this.

Line 34 should be connected to line 14 supplying purified water to dispensing valve 16 at a point sufficiently close to valve 16 so that the pressure of purified water in line 34 when valve 16 is opened will be below the control pressure for diaphragm valve 30. This will ensure continuous supply of water at elevated pressure from storage container 12 while valve 16 remains open.

When valve 16 is closed the pressure in line 34 rises to close diaphragm valve 30 and thus shuts off the supply of impure elevated pressure water to storage container 20. Operation of the apparatus of this invention will be described for a reverse osmosis module 12 producing about 6 gallons per day of purified water and about 33 gallons per day of blowdown or brine. Restricted passageway 24 can be formed of 16 feet of 0.032 internal diameter plastic tubing which will allow about 33 gallons of flow per day at a pressure only slightly below that of, for example, 80 psig pressure in feed water pipe line 10. Restricted passageway 40 can be formed of 15 feet of 0.032 internal diameter plastic tubing which will allow about 6 gallons of flow per day at a pressure of about 10 psig. It will be understood that there will be a relationship between the output of the module 12, the size of restricted passageway 40 and the stable or normal pressure in storage container 20. The similarity in size of restricted passageways 24 and 40 which pass a wide difference in flow, is due to the widely different pressure under which they operate. Pressure responsive valve 30 will be set or adjusted so that pressure in line 34 of less than 10 psig will open valve 30 allowing flow from line 28 to line 32 and into storage container 20, while pressure above 10 psig in line 34 will close valve 30 and shut off flow from line 28 to line 32.

Restricted passageway 24 will maintain pressure of the water in module 12 at close to or slightly below the input feed water pressure that is about 80 psig. The operating pressure across the membrane in module 12 will be about 70 psig (with a 10 psig pressure in storage container 20), thus maintaining an advantageously high pressure drop across the membrane resulting in good operating efficiency for the type of unit and operating conditions described.

As storage container 20 fills with purified water the gradient barrier 36 drops as impure water is released through restructed passageway 40 and out sewer line 42. If the purified water input is sufficient to displace all the impure water in container 20 then this will be likewise released through restricted passageway 40. Meanwhile brine or blowdown is being released from module 12 through restricted passageway 24 and out of line 26.

When dispensing valve 16 is opened, pressure is immediately lowered in line 34 causing actuation of diaphragm valve 30 which opens, allowing impure water at elevated pressure to flow through line 32 into the bottom of storage container 20. This pressurizes the purified water in the top of storage container 20 which flows out of line 18 through line 14 and out of dispensing valve 16. Purified water will continue to flow out of dispensing valve 16 at elevated pressure as purified water is withdrawn from storage container 20. Impure water introduced to take its place in storage container 20 causes the gradient barrier 36 separating these two waters to rise.

When dispensing valve 16 is closed pressure increases in line 34 and diaphragm valve 30 closes, shutting off flow of impure water into storage container 20. Outflow of water from storage container 20 through restricted passageway 40 restores normal 10 psig pressure inside storage container 20, and it begins to fill again with purified water produced by module 12.

Figure 2:
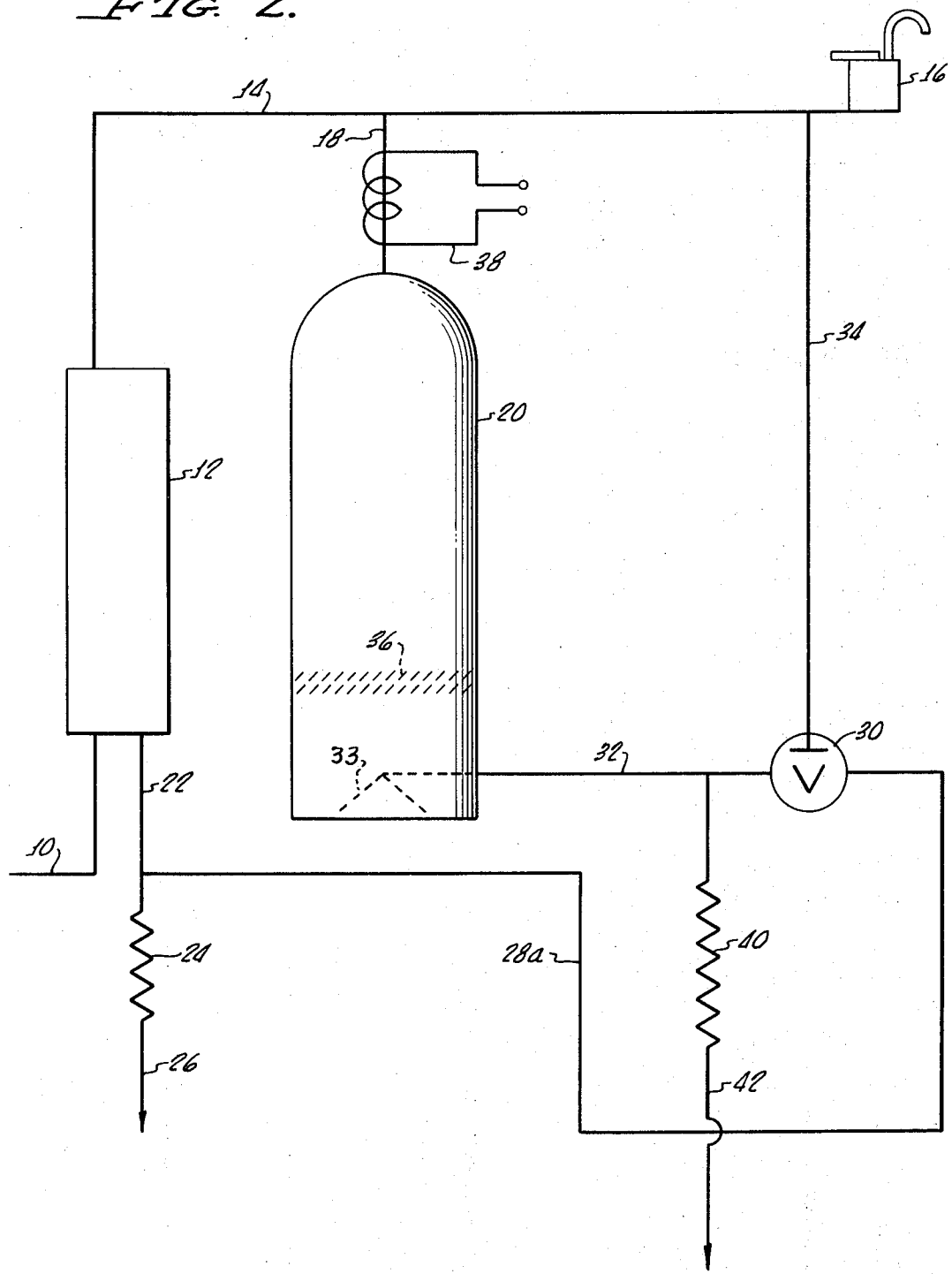
FIG. 2 is a diagrammatic illustration of a modified form of the invention illustrated in FIG. 1.

The embodiment illustrated in FIG. 2 comprises a modified form of the invention in which the means for introducing impure water into the storage container includes a pipe line supplying said impure water directly from the blowdown outlet of the reverse osmosis purification unit or module, whereas in the embodiment of FIG. 1 impure water was supplied directly from the impure water feed line as previously described. Referring now to FIG. 2 the feed water pipe as shown at 10 supplies impure water to purification unit or module 12 from which purified water flows through transfer pipe 14 to dispensing valve 16 and also through line 18 into storage container 20. Blowdown or brine line from purification module 12 is connected by line 22 through restricted passageway 24 to sewer line 26, all as previously described. Impure water supply pipe line 28a is, however, in the embodiment of FIG. 2, connected directly to blowdown outlet pipe line 22 from reverse osmosis purification module 12, to supply impure water to pressure responsive valve 30 and pipe line 32 for introduction into pressure container 20 as shown, when dispensing valve 16 is opened. Line 34 supplies water normally under slightly above atmospheric pressure to valve 30 and at lowered pressure for opening or actuation of valve 30 when dispensing valve 16 is opened. Separator 36 in storage container 20 and heater 38 around line 18 are also identical with those shown and described with respect to FIG. 1.

The embodiment of FIG. 2 provides a surge of water through reverse osmosis purification module 12 each time valve 30 opens to provide flow of impure water through line 32 into storage container 20. This periodic high rate of flow through module 12 is extremely useful for flushing out solids, slime and other foreign material which may have accumulated on the surfaces of the membrane and associated structures, and provides a purging action that can contribute materially to membrane efficiency and long life. Impure water taken from the module 12 blowdown outlet will, at least for the initial flow period, contain higher salt content than impure water taken directly from the feed line source as in FIG. 1. This higher salt content is, however, of little importance, except perhaps when all the purified water has been exhausted from storage container 20, and impure water is being supplied temporarily through dispensing valve 16. The benefits derived from the automatic, periodic flushing of the reverse osmosis module are, on the other hand, substantial.

The term "slightly higher than atmospheric pressure" as used herein is intended to denote a pressure sufficiently above atmospheric to constitute a pressure level from which the purified water pressure can be reduced by opening dispensing valve 16 to actuate pressure responsive valve 30. This may be for practical operating reasons a pressure of a few pounds up to about 20 pounds, preferably about 10 psig. The term "elevated pressure" as used herein is intended to denote a pressure sufficiently elevated above atmospheric to provide operating pressure for a distributing system. This is most often 40 to 100 psig in municipal supply mains, the higher pressures being preferred for greater reverse osmosis efficiency.

The apparatus of this invention is useful for providing storage at relatively low pressure of purified water produced from a reverse osmosis purification module, and making purified water so stored available at elevated pressure for transfer to point of use. It is particularly useful in so-called home units in which a reverse osmosis system supplies a small daily output of purified water for drinking and cooking purposes.

I claim:

1. Apparatus for temporarily storing purified water produced by a reverse osmosis purification unit, and which pressurizes said purified water for delivery to point of use, in which the improvement comprises:
    a. a closed, pressure-resistant storage container into which said purified water is transferred from said purification unit and temporarily stored;
    b. means for maintaining said purified water in said storage container normally under pressure slightly higher than atmospheric;
    c. means for dispensing purified water from said storage container including a dispensing valve that is normally closed;
    d. means for introducing impure water under elevated pressure into said storage container, said impure water introducing means being actuated by means responsive to a reduction of pressure in the transfer pipe supplying purified water to said dispensing valve in said dispensing means caused by opening said dispensing valve in said dispensing means, thereby pressurizing the purified water stored in said storage container for delivery through said dispensensing valve; and,
    e. pressure transmitting means separating the purified water temporarily stored in said storage container from impure water introduced thereinto.

2. Apparatus according to claim 1 in which said means for introducing impure water into said storage container is controlled by a pressure responsive valve normally closed and which is opened by hydraulic means actuated by the opening of said dispensing valve included in said purified water dispensing means.

3. Apparatus according to claim 2 in which a transfer pipe line from said storage container connected to said dispensing means containing purified water normally under pressure slightly higher than atmospheric communicates with one side of the diaphragm of a diaphragm valve to normally maintain said diaphragm valve closed.

4. Apparatus according to claim 3 in which said diaphragm valve is adjusted to be normally maintained closed by pressure on its diaphragm of purified water connected to said dispensing means and normally under pressure slightly higher than atmospheric, and is opened by lowering of the pressure of purified water on its diaphragm caused by opening the dispensing valve included in said dispensing means.

5. Apparatus according to claim 4 in which said diaphragm valve is adjusted to be normally maintained closed at a pressure on its diaphragm of greater than about 10 psig and to be opened at a pressure below about 10 psig.

6. Apparatus according to claim 1 in which the purified water temporarily stored in said container is maintained normally at a pressure slightly above atmospheric by means for releasing a restricted flow of liquid from said container.

7. Apparatus according to claim 2 in which the hydraulic means actuated by the opening of said dispensing valve comprises a water supply pipe connected to the transfer pipe supplying purified water to said dispensing valve at a point at which the pressure in said transfer pipe is lower than the control pressure in said pressure responsive valve when said dispensing valve is opened.

8. Apparatus according to claim 1 in which the means for introducing impure water into said storage container include a pipe line supplying said impure water directly from the pipe line supplying feed water to said reverse osmosis purification unit.

9. Apparatus according to claim 1 in which the means for introducing impure water into said storage container include a pipe line supplying said impure water directly from the blowdown outlet of said reverse osmosis purification unit.

* * * * *